Patented Mar. 30, 1937

2,075,768

UNITED STATES PATENT OFFICE 2,075,768

FIBER COMPOSITION AND METHOD OF MAKING THE SAME

Steven Wilson, Cleveland, Ohio, assignor, by direct and mesne assignments, of thirty-seven and one-half per cent to Thurlow G. Gregory and twenty-five per cent to William J. Wesseler, East Cleveland, Ohio No Drawing. Application December 23, 1931, Serial No. 582,885

5 Claims. (Cl. 167—13)

This application is a continuation in part of my application Serial No. 387,264, filed August 20, 1929.

This invention, as indicated, relates to a fiber composition and method of making the same. More particularly this composition comprises fibrous material such as disintegrated or shredded or ground vegetable matter such as woods of various character, corn cobs, straw, peanut hulls, and the like, or mineral fiber such as asbestos, which has been combined with a binder in substantial amount, the binder having special characteristics hardening the composition so that it may be suitable for various uses. The composition may be substituted for hard rubber, bakelite, and like compositions in many cases and may be rolled into sheets or pressed into any desired shape and may be worked upon and machined with perfect freedom. It is adapted to receive screws and nails without splitting. It is also part of the invention to provide the composition with suitable germicidal ingredients whereby the finished product will kill germs coming into contact with the surface of such composition. It is particularly adapted for certain uses wherein the utmost sanitary precautions must be taken, as in hospital equipment and nurseries. As material for sanitary germ-destroying articles it may be effectively utilized for telephone mouthpieces, toilet seats, dental equipment, cuspidors and hospital equipment of all kinds, which has large usage by different members of the public, as it will retain its germ killing properties for a long time. The material is light in weight and is not readily frangible and is not cold to the touch as is glass and enamelware. An additional feature of the invention resides in the combination with the material of various colors.

Heretofore in fabricating articles of finely divided fibrous material, it has been customary to use relatively large proportions of water and to subject the articles in course of manufacture to high temperatures and this has made it impossible to combine with the material, germicidal ingredients having relatively long continuing effect upon superficial bacteria. With the present process all of the operations excepting the steps involved in the original preparation of the binder are carried on as a cold process and a relatively small proportion of water is used. The germ killing ingredients are inserted in substantially dry form and thereby the full strength of the substantially dry germ-destroying ingredients referred to is retained in the finished product.

In the following description there will be set forth in detail one embodiment of the invention and one method of producing the same, but such disclosed means and mode constitute, however, but one of several of various structural forms and steps in which the principle of the invention may be used.

The basic substance of the composition comprises vegetable or like fiber which may be in the form of material disintegrated in any desired manner such as by shredding, grinding, or the like. The character of the material may be varied with the character of the product to be finished and if a very fine grained article is to be produced, it may be found desirable to have the material in the form of the finest flour grindings. After the material is reduced to the desired degree of fineness, there is combined therewith a binder and such other material in the way of germicidal ingredients which may be required for the particular article in view. Different kinds of binders may be used to make this germ-killing substance such as sodium silicate glue or casein glue. These binders, however, tend to make the completed product too heavy. The preferred binder is formed of dry animal glue to the amount of 60% by weight of the total dry binder ingredients and dry bichromate of potassium to the amount of 40% by weight of the total binder ingredients exclusive of the water content. It is well known that bichromate of potassium when used in relatively small proportions of from 2% to 10% of the dry glue content will harden glue by a tanning effect. It is a part of this invention, however, to use in the dry content of the binder 40% of dry bichromate of potassium to 60% of dry glue as when used in that specific proportion with the relatively small amount of water as later used in this binder a substance of unusual hardness is secured. More than 40% of dry bichromate of potassium can not be successively used, as the binder will not then go into the fiber, due to the hardening effect that the bichromate of potassium has upon the glue. If used in the smaller proportions of 2% to 10% of the dry glue as referred to the fibers will not be effectively held together when made by this relatively dry cold process.

When color and germ-killing material is to be added, it is desirable to mix the same thoroughly into the fibrous material having the coloring matter and the germ-killing material in dry form, and in addition to color the binder. By using the germ-killing material in dry or substantially dry form, as indicated, such dry material becomes intermixed with the fibrous material and is distributed through the same in solid deposits. In this form it will retain its germ-killing properties for a long time, the germicidals becoming a dry integral part of the completed product. If regular commercial liquid germicidals are poured into the fibers, the completed product will lose much or all of its germ-killing effectiveness as soon as the liquids evaporate. When chemicals are added in dry form or in such form as will leave substantial deposits of the chemicals in dry form distributed through the dry finished product, these dry chemicals become a dry integral part of the finished product and the whole product retains its effectiveness for killing superficial bacteria for a long period of time.

The mixing of the coloring matter with the glue is preferably carried out by mixing color with water in the proportions of about one part of color to 18 parts by weight of water, and into the colored solution thus produced, adding glue as herein explained. Into the glue pot the required amount of colored water is poured for the quantity to be mixed, about 90 parts by weight of the colored water to 100 parts of the total mix, when the desired percentages in the product colored are 70% by weight colored fiber and 30% by weight binder. The colored water is reduced approximately seven parts for each 5% by weight reduction of the binder when the mix is changed, allowing, of course, a variation of these figures to compensate for the variation in ingredients and the quality or kind of the glue. After the glue is melted and thoroughly mixed with this colored water it will be colored glue. To the colored glue 40% by weight of dry bichromate of potassium is added, the quantity of dry glue being 60% by weight, and this mixture is agitated preferably with the application of a small amount of heat until there is thorough unification between the colored glue and the bichromate of potassium, and until it begins to thicken up into a relatively stringy mass. These proportions are 40% and 60% and are proportions by weight of the dry ingredients exclusive of the water content in the binder, the dry bichromate of potassium being 40% and the dry glue being 60% by weight of the dry content of the binder, and these percentages are exclusive of the water. This entire colored mass is slowly poured into the colored fiber and stirred thoroughly during the operation. The entire completed mass is passed through a mechanical mixer once or twice and the product is then ready to be rolled into sheets or pressed into blocks or any other desired form. This will require pressure varying with the required density of the finished product. When the product is impregnated with germicidals to render it effective in killing superficial bacteria the following operations are used to that end. The percentages are based upon the use of the best hide glue but slight variations may be made to compensate for small variations in the quality and strength of the various ingredients used.

The germicidals are prepared separately. They are to be secured whenever possible in dry form. The crystals are ground, mixed with the powdered germicidals, making a separate total assemblage of the germicidals. The ground total assemblage of germicidals is thoroughly mixed into the dry fibers so as to have a mass of fibers and chemicals. When a colored finished product is required, the chemicals are mixed into the colored fiber so as to have a mass of fibers, color and chemicals. These germicidals may be changed or varied for different effects or results. The binder is added in the same manner as is done in making the colored product without the germicidals.

While the germicidals as above described are to be supplied whenever possible in dry form it may be found desirable in certain instances to unify the dry mixture with a small quantity of ammonium hydroxide or similar substance which should in no case do more than render the mass soft and pliable and of a slightly lumpy consistency.

To illustrate how a completed product is made that will kill mouth bacteria that may come in contact with its surface, the following data is set forth:

| | Per cent |
|---|---|
| Fibrous material | 70 |
| Color | 5.5 |
| Carbolic crystals | 2 |
| Paraformaldehyde | 2 |
| Iodoform powder | .5 |
| Glue | 12 |
| Bichromate of potassium | 8 |
| | 100 |

Water content to be added to the above comprises 62½% up to 87½% of the weight of the above ingredients, making the weight of the completed product with the water content 187½%, the water being at its maximum 87½/187½% of the total weight before the product is pressed and dried. It is to be understood that this is at no time a moist substance and even at heavy pressure in a mold does not force out any appreciable amount of moisture merely showing a slight wetting on the mold surface.

The procedure in completing the product is as follows:

(a) Grind the amount of crystals, if large, and mix them with powdered germicidals in a vessel.

(b) Thoroughly mix the carbolic (phenol), paraformaldehyde, and iodoform, forming a completely dry mixture. In the event ammonium hydroxide is used to unify the mass as above set forth, the mass will be a soft pliable slightly lumpy mass as has been stated.

(c) Mix the above mass thoroughly into the fiber.

(d) Add the binder to the combined fiber and germicidals.

(e) Put the whole mass through a mechanical mixer.

As all of the small amount of water used enters the fibrous material as a glue solution made relatively dense by the relatively large proportions of bichromate of potassium the fibrous and germicidal materials do not at any time become wet enough to adversely affect the germ-killing properties of the relatively dry germicidals. The bichromate of potassium shown in the tabulation as 8% is 40% of the dry binder ingredients or in the ratio of 40% of bichromate to 60% of dry glue, making 100% of dry binder ingredients.

The method of preparing various articles has already been indicated in part. Thus, where a very finely grained product is desired with great hardness, vegetable or equivalent fiber of the finest flour-grinding is used and the amount of binder used therewith is varied from 80% by weight of fiber to 20% by weight of binder, to 50% by weight of fiber and 50% by weight of binder, according to the strength and weight of the finished article. If such finished article is to be screw-driver handle, or the like, the proportions used would be from 30% by weight to 50% by weight of fiber and from 70% by weight to 50% by weight of binder. Where, however, the article was intended for use as a tray or receptacle which would be subjected to practically no strains, the proportions first named would be utilized. The material of the fineness referred to would be placed in a receptacle and the binder would be prepared in a separate receptacle, hide glue being melted in water to the desired consistency and 40% by weight of dry bichromate of potassium added to 60% by weight of dry glue until the binder becomes thoroughly intermixed. As stated above the percentages mentioned are percentages by weight of the dry content of the binder exclusive of the water content. The binder would then be poured into the receptacle containing the finely divided fiber and the mass would be thoroughly intermixed until it assumed a light spongy consistency. It is then placed into molds and subjected to pressure, using a hydraulic press, if desired, until a finished product of the desired character would be produced. As stated, if coloring matter was to be added, it would be added both to the vegetable or like fiber and to the binder. The germicidal ingredients are added to the mass of fibrous material in dry form thus leaving deposits of said ingredients in dry form entrapped within or intermingled with the fibrous material and intimately held together as a hardened product by said binder.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:

1. A method of forming articles with elements having germicidal characteristics effective upon superficial bacteria as well as acting as a preservative for the binder, which includes the steps of intermixing dry water-soluble germicidal elements into dry fibers as a cold process, separately mixing animal glue with water and bichromate of potassium to form a stringy mass, adding such stringy mass as a binder to the mixture of germicidal elements and fibers and mechanically mixing the same while substantially dry into a plastic mass, and pressing said mass into the desired form of article.

2. A finished composition of matter including filler substance of a fibrous character, a binder of glue with hardening and incorporated preservative germicidal matter intermixed therewith engaged about said fibrous filler substance, and additional water-soluble germicidal ingredients independent of said germicidal matter incorporated in said binder entrapped between said fibrous filler substance and said binder elements in dry form and present as unmodified individual active uncombined solid particles of said germicidal elements distributed throughout the mass and on every exposed surface of said composition and serving to kill superficial bacteria.

3. A finished composition of matter including filler substance of a fibrous character, a binder of glue with bichromate of potassium intermixed therewith and having a hardening and preservative germicidal action engaged about said fibrous filler substance, and additional germicidal ingredients comprising portions of carbolic crystals, paraformaldehyde powder, and iodoform powder entrapped as unmodified individual active uncombined solid particles of dry germicidal elements distributed throughout the mass and on every exposed surface of said composition and serving to kill superficial bacteria.

4. A commingled, compressed, bonded together, dry and hardened, substantially non-frangible composition of matter comprising finely divided fibrous material, water soluble germicidal matter in dry state, and a binder engaged upon the particles of said fibrous material and bonded to said dry germicidal matter, the binder and fibrous material forming a relatively hard non-frangible mass with the particles of germicidal material distributed therethrough, the said dry germicidal matter being in such state of distribution throughout the compressed, dry and hardened, non-frangible mass and being included in an amount whereby to germicidally act independently of germicidal matter in the binder and in an amount whereby to kill superficial bacteria positioned upon any exposed surface of the compressed, dry and hardened, non-frangible mass.

5. A method of mixing together a body of finely divided fibrous material, a body of water-soluble germicidal matter in undissolved state selected from the group consisting of carbolic crystals, paraformaldehyde powder, iodoform powder and mixtures thereof and a binder from the group consisting of animal glue, casein glue and sodium silicate for binding together said fibrous material and said undissolved germicidal matter, pressing the total mixture into its desired physical form and allowing the mass to dry and harden, the binder in the freshly mixed mass being in an amount and state of liquidity and distribution causing the freshly mixed mass to be of a light, spongy consistency, the said binder and said pressure being in amounts forming the mass into a hard and substantially non-frangible composition when said composition is dry and hardened, the said germicidal matter in the undissolved state being included in an amount within the freshly mixed, light, spongy mass and remaining in an undissolved state as independent, chemically unmodified, dry germicidal matter within and distributed throughout the mass when the mass is dry and hardened and in an amount whereby to germicidally act independently of germicidal matter in the binder and in an amount and state of distribution whereby to kill superficial bacteria positioned upon any exposed surface of the mass when said mass is dried and hardened.

STEVEN WILSON.